May 13, 1969   C. J. STEKETEE   3,443,531
SOWING ELEMENT FOR A PRECISION SOWING MACHINE
Filed May 2, 1966

INVENTOR
CORNELIS J. STEKETEE
BY
ATTORNEY 3,443,531
SOWING ELEMENT FOR A PRECISION SOWING MACHINE
Cornelis J. Steketee, Korterveg 11,
Driewegen, Netherlands
Filed May 2, 1966, Ser. No. 547,003
Claims priority, application Netherlands, May 18, 1965,
6506277
Int. Cl. A01c 7/18
U.S. Cl. 111—36    1 Claim

ABSTRACT OF THE DISCLOSURE

This invention relates to seed sowing machines or planters having at least one seed dispensing drum which may be driven by a travelling roller or wheel engaging the ground or by a separate, positive power source, such as the power take-off of tractor employed for pulling said seed sowing machine. Each seed dispensing drum may be connected to a travelling roller, or if said roller does not properly engage the ground, the drum may be connected to the separate, positive power source, there being at least one travelling roller for each seed sowing drum.

Background of the invention

The invention relates to a sowing element for a precision sowing machine provided with a drum driven by travelling rollers of the element, said drum having at its circumference recesses each for taking up a seed.

The exactness of sowing seeds with a machine of this kind depends on the condition of the ground, as on slipping of the driving travelling rollers the spacing of the successive seeds will become larger. Said inaccuracy of the drill spacing for the sowing element operating side by side in the machine does not occur with a sowing machine in which the sowing elements are driven by a transverse shaft rotatably supported on the frame of the machine and in wihch the sowing elements each being provided with a driving pulley.

Summary of the invention

The invention is concerned with a sowing element which may be used both in a machine having a common driving shaft for a plurality of elements and in a machine having an individual drive for each sowing element by the travelling rollers. According to the invention a chain or belt pulley is carried by the axle of the travelling rollers and said pulley being adapted to be connected by a belt or chain to a pulley secured on a common driving shaft of a plurality of sowing elements, the travelling rollers being adapted to be rigidly coupled to their axle. With said arrangement the sowing element can be driven by said common driving shaft by disconnecting the travelling rollers from their axle and coupling the chain or belt pulley to the axle. If said drive is interrupted e.g. by disconnecting the driving pulley from the axle of the travelling rollers and said rollers are coupled to said axle the axle will be driven only by the travelling rollers.

Brief description of drawing

The invention will be further described with reference to the accompanying drawing, showing an embodiment of the sowing element according to the invention. In the drawing

Detailed description of the invention

Figure 1:
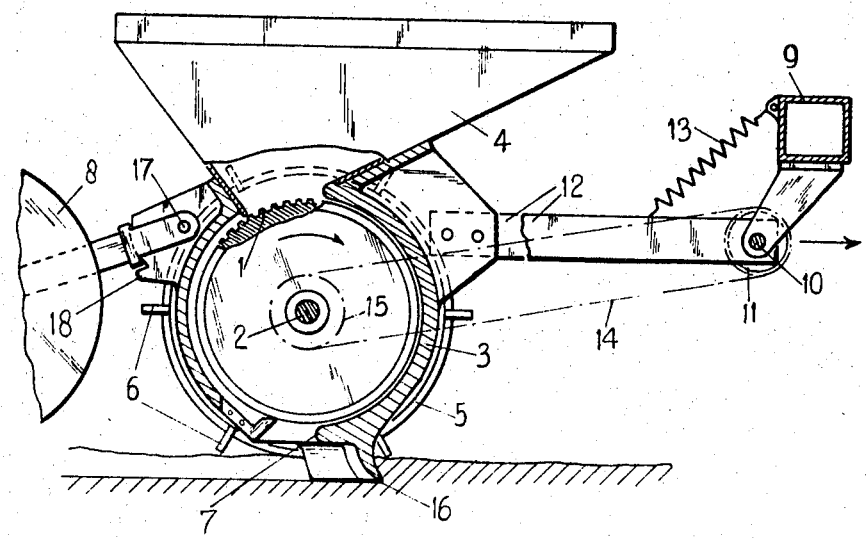
FIG. 1 is a side elevation with part in longitudinal section taken on line I—I of FIG. 2, which itself is an end view of two sowing elements.
Figure 2:
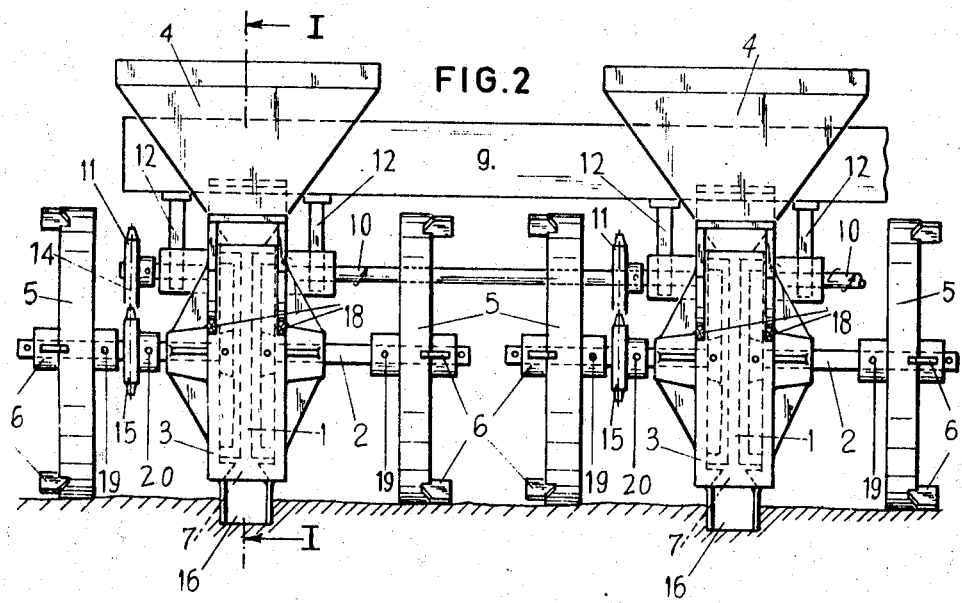

The drum 1 of each sowing element having at its circumference recesses each for taking up a seed from a hopper 4 is secured on an axle 2 and enclosed by a cylindrical casing 3 arranged below the storage hopper 4 for the seeds. A travelling roller 5 is disconnectably secured to both ends of each axle 2 and is provided with blades 6 at its circumference for preventing slipping of the rollers. When the machine is travelling on the ground and the rollers 5 are connected to the axle 2, e.g. by a pin 19 the drums 1 are rotated, so that at every turn a seed will be delivered at 7. The casing 3 of each sowing element may be provided with a roller 8 for closing the furrow made by the share 16. The pressing roller 8 is carried by a lever having a pivot 17 at the casing 3 and the pivoting movement of said lever is limited by an abutment 18.

For commonly driving a plurality of sowing elements operating side by side a shaft 10 is rotatably supported by a beam 9 and has for each sowing element a belt or chain pulley 11 secured thereto, said shaft 10 being driven independently of the ground engaging rollers 5 of the sowing elements, for example, by the power take-off shaft of a tractor to which beam 9 carrying the sowing elements may be connected.

A lever 12 secured to the casing 3 is supported on shaft 10 of the pulley 11 for swinging movement and a spring 13 is secured to said lever, said spring at its other end being secured to the frame beam 9. The driving pulley 11 by means of a belt or chain 14 is connected to a pulley 15 secured to the axle 2 of the travelling rollers 5 e.g. by a pin 20, so that the drum 1 may also be driven by the common driving shaft 10. The travelling rollers 5 are then disconnected from the axle 2 by removing the pin 19.

When the drum 1 is not to be driven by the common shaft 10 but by the travelling rollers 5 the pulley 15 is disconnected from the axle 2 by removing the pin 20 and said rollers are then rigidly connected to the axle 2 by means of pin 19.

If desired, each drum 1 may be driven by the axle 2 through the intermediary of a toothed gearing.

What I claim is:
1. A sowing machine comprising a plurality of sowing elements, each including an axle, a drum fixed on said axle, and at least one travelling roller mounted on and supporting said axle, said drum having on its periphery a series of recesses each for pocketing a seed, means for releasably connecting selectively said travelling rollers to said axle, a driving disc on said axle, means for releasably connecting selectively said disc to said axle, a common drive shaft for a plurality of sowing elements, and a drive disc secured on said shaft for each sowing element and in driving connection with the respective driving disc, whereby said drums may be driven selectively by the respective travelling roller and said common drive shaft.

References Cited

UNITED STATES PATENTS

| | | | |
|---|---|---|---|
| 2,626,579 | 1/1953 | Shaw | 111—134 X |
| 3,026,001 | 3/1962 | Landgraf | 111—78 X |
| 1,103,357 | 7/1914 | Gilroy | 111—35 |
| 2,981,213 | 4/1961 | O'Neil | 111—85 X |
| 2,996,926 | 8/1961 | Hansen | 111—37 X |
| 3,133,515 | 5/1964 | Beebe | 111—36 |
| 3,240,174 | 3/1966 | Jones | 111—36 |

ABRAHAM G. STONE, *Primary Examiner.*

A. E. KOPECKI, *Assistant Examiner.*